A. A. ARNOLD.
EYE PROTECTOR.
APPLICATION FILED NOV. 24, 1917.
1,374,896. Patented Apr. 19, 1921.
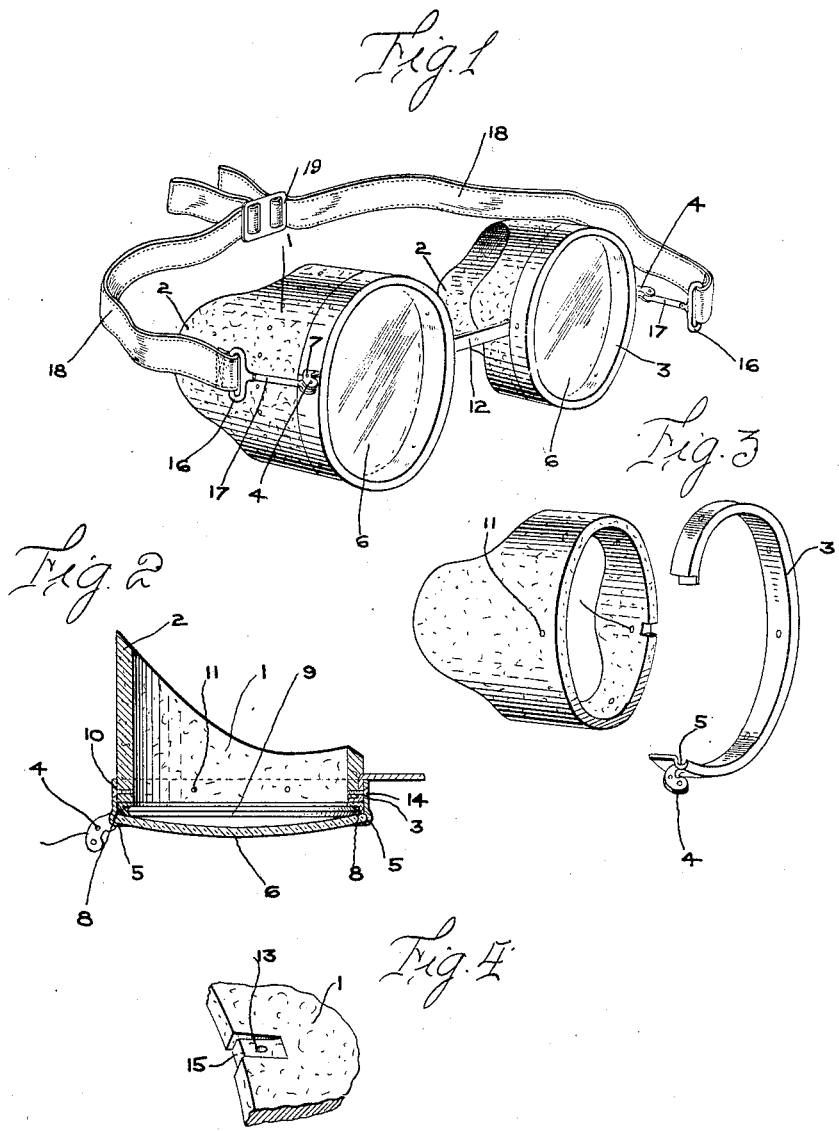

UNITED STATES PATENT OFFICE.

ARTHUR A. ARNOLD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE-PROTECTOR.

1,374,896.    Specification of Letters Patent.    Patented Apr. 19, 1921.

Application filed November 24, 1917. Serial No. 203,782.

*To all whom it may concern:*

Be it known that I, ARTHUR A. ARNOLD, a citizen of the United States, residing at Southbridge, in the county of Worcester and State of Massachusetts, have invented certain new and useful Improvements in Eye-Protectors, of which the following is a specification.

This invention relates to new and useful improvements in goggles and more particularly to what will be known as a fiber goggle, the main object of the invention being the provision of a goggle of this character wherein all metal parts that would come in contact with the face are eliminated and at the same time the several parts forming the goggle are of standard size and form, thus eliminating the necessity of manufacturing special parts for its construction.

Another object of the present invention is the provision of a goggle which includes fiber eyecups and means for supporting the lenses in front of the eyecups without attaching them directly to the same whereby the lenses can be readily exchanged when desired.

With the above and other objects in view the invention consists in the novel features of construction and the combination and arrangement of parts hereinafter more fully set forth, pointed out in the claims and shown in the accompanying drawings, in which—

Figure I is a detail perspective view of a pair of goggles constructed in accordance with my invention.

Fig. II is a transverse sectional view of one of the eyecups.

Fig. III is a detail perspective view of the eyecup and lens frame, and

Fig. IV is a detail perspective view of a portion of one edge of the eyecup illustrating the notch for receiving the end of the nose bridge.

In the construction of my improved goggle the eyecups which are indicated by the numeral 1 are preferably formed of a fiber material and cut away at the inner ends thereof whereby they will readily conform to the face of the wearer, and furthermore they are provided with an extension as indicated at 2 that projects rearwardly onto the temple to hold the eyecups against any lateral movement when in position on the face.

At the forward end of the eyecups is the metallic retaining ring 3 which is used for supporting the lenses in front of the cups and support the temple lugs 4. At the outer edge of this ring 3 is an annular groove 5 adapted to receive the edges of the lens 6 which is securely held in place by clamping the ring over the outer end of the eyecup and fastening the ends of the ring by means of a screw 7 which extends through the temple ends 4. Arranged behind the lens 6 and abutting against the end of the eyecup is a rim 8 substantially V-shaped in cross-section, which supports a second lens, that will be known as a protective lens, whereby should the outer lens become accidentally broken this lens, which is indicated by the numeral 9, will prevent the flying particles from coming in contact with the eye. It will be apparent that the rim 8 is securely held in place by having the lens 6 bearing directly against the outer edge of the rim and the lens 9, and it will also be noted that the outer intermediate portion of the rim is frictionally engaged with the inner wall of the ring 3 so that the rim will not drop out as soon as the lens 6 becomes broken.

It will be noted that after the rings 3 have been placed in position upon the ends of the eyecups they are secured thereto by means of the screws 10 which extend through the openings in the ring and engage with suitable threaded openings 11 in the eyecups. The eyecups 1 are suitably connected together by means of the bridge strap 12, the ends of which are extended beneath the ring 3 and arranged within the recess 13 formed in the side of the eyecup, and are securely held in place by having the screw 14 extended therethrough. It will be apparent that in order to retain the ends of the bridge strap against removal the extreme ends thereof are extended at right angles and disposed between the rim 8 and the end of the eyecup, the end of the eyecup being slightly recessed as shown at 15 to receive the ends of the bridge strap.

In order that the eyecups may be readily attached to the face of the wearer I provide the loops 16 which are secured to the temple lugs 4 through the medium of the shanks 17, the ends of which are pivotally connected to the temple lugs. Attached to each of the loops 16 is a strap member 18 the outer end of which is adapted to be engaged with a buckle 19, whereby the strap ends may be readily adjusted to securely fasten the eyecups to the face. While I have shown and described the loops 16 and straps 18 as the preferred way of attaching my improved goggles to the face it will be apparent that the usual spectacle temple can be used equally as well.

It will be readily apparent from the foregoing that I have provided a pair of goggles that are extremely light in weight and so constructed that they will readily conform to the face of the wearer. It will also be noted that by having the two sets of lenses the eye will be protected from flying glass should the outer lens become broken by having an object striking against the same. Furthermore the two lenses can be readily removed from the eyecups by disconnecting the ends of the ring 3 as both these lenses are supported in front of the eyecups by this ring.

I claim:

1. A pair of goggles including eyecups, a lens positioned against the outer end of each eyecup, a second lens arranged in advance of each of the first lenses and rim members attached to the eyecups and engaging the second lenses to hold the same in place, the second lenses being in such position as to retain the first lenses in position against the eyecups.

2. A pair of goggles including eyecups, a removable rim arranged over the outer end of each cup, a lens arranged within each of said rims, a second rim disposed between the lens and the end of the eyecup, a second lens supported within the second rim, means connecting said eyecups and means carried by the eyecups for supporting them in position upon the face of the wearer.

3. A pair of goggles including eyecups, a lens arranged against the outer end of each eyecup, a second lens arranged in advance of each of the first lenses and a rim attached to the eyecup to support the second lenses against the first lenses to securely hold them in position against the ends of the eyecups.

4. A pair of goggles including eyecups, a removable rim arranged over the outer end of each cup, each of said rims having a groove therein, a lens arranged within each groove, a rim V-shaped in cross section disposed between the lens and the end of the eyecup, a second lens supported within the V-shaped rim, means connecting said eyecups and means carried by the eyecups for supporting them in position upon the face of the wearer.

5. An eye protector including eye cups of non-metallic material, separate non-metallic means connecting said cups, lenses forming closures for the front of the cups and means for uniting the several parts, including rim members embracing the cups, their central connecting member and the lenses, means for securing the rim members in place to securely connect the several parts, and head engaging means secured to said metallic rim members for securing the protector in position on the face.

6. An eye protector including eye cups of non-metallic material, separate non-metallic means connecting said cups, lenses forming closures for the front of the cups, and means for uniting the several parts, including rim members embracing the cups, their central connecting member and the lenses, means for securing the rim members in place to securely connect the several parts, end pieces carried by the rim members for detachably connecting the ends thereof, and temples carried by the end pieces and extending rearwardly for retaining the protector in position on the face.

7. Eye protectors including non-metallic eye cups centrally grooved, a connecting member for the eye cups having its termini fitting within the grooves, lenses forming closures for the front of the lens cups and metallic rim members exteriorly encircling the forward portions of the cups, said members having inturned portions engaging the lenses for securing them in position on the cups and having portions engaging the ends of the central connecting member to retain said ends in position within the grooves of the cups.

8. Eye protectors including non-metallic eye cups centrally grooved, a connecting member for the eye cups having its termini fitting within the grooves, lenses forming closures for the front of the lens cups and metallic rim members exteriorly encircling the forward portions of the cups, said members having inturned portions engaging the lenses for securing them in position on the cups and having portions engaging the ends of the central connecting member to retain said ends in position within the grooves of the cups, and head engaging means carried by said metallic rim members for securing the protector in position on the face.

In testimony whereof I have affixed my signature, in presence of two witnesses.

ARTHUR A. ARNOLD.

Witnesses:
H. E. COLEMAN,
H. K. PARSONS.